Figure 4:
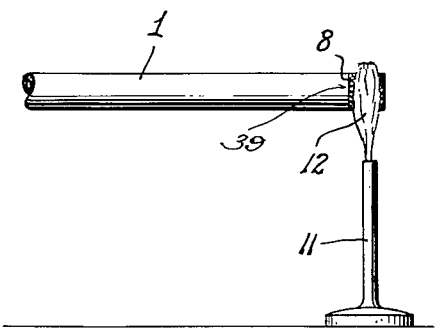

July 24, 1956 K. J. GERMESHAUSEN 2,756,361
GASEOUS-DISCHARGE DEVICE AND METHOD OF MAKING THE SAME
Filed July 6, 1951 5 Sheets-Sheet 1
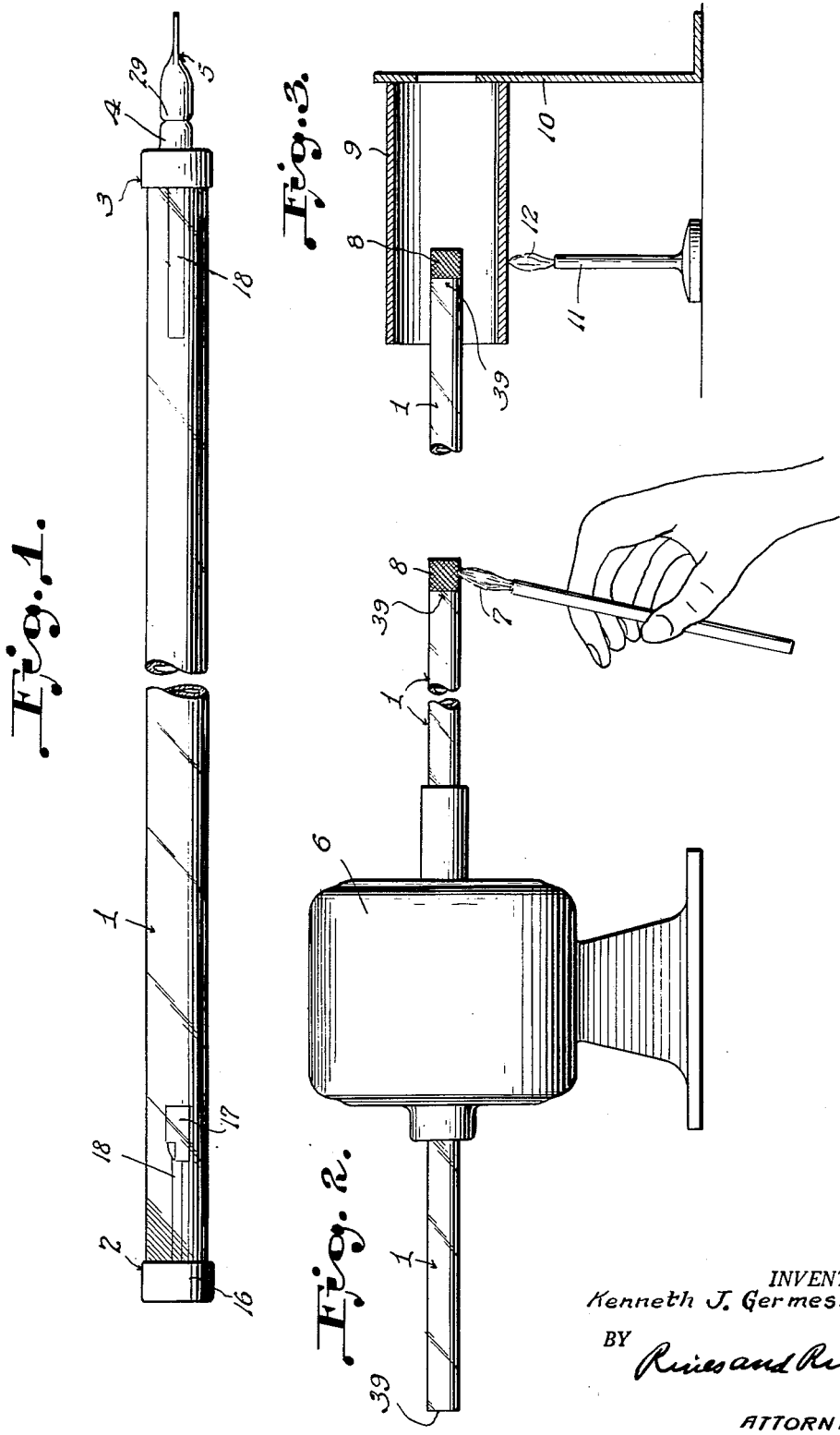
INVENTOR.
Kenneth J. Germeshausen
BY Rines and Rines
ATTORNEYS.

July 24, 1956  K. J. GERMESHAUSEN  2,756,361
GASEOUS-DISCHARGE DEVICE AND METHOD OF MAKING THE SAME
Filed July 6, 1951  5 Sheets-Sheet 2

INVENTOR.
Kenneth J. Germeshausen
BY
Rines and Rines
ATTORNEYS.

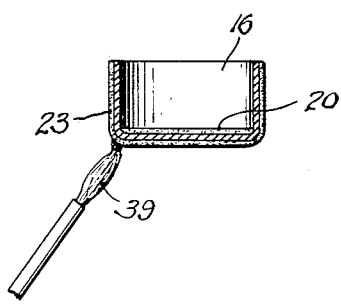
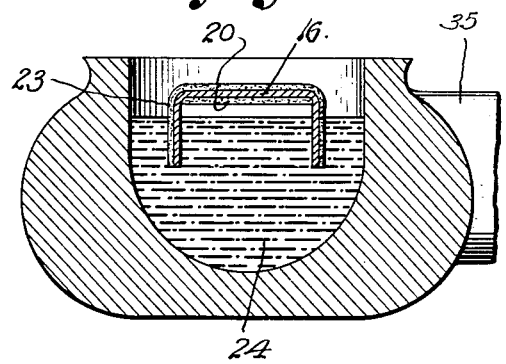
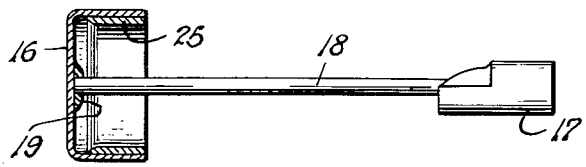
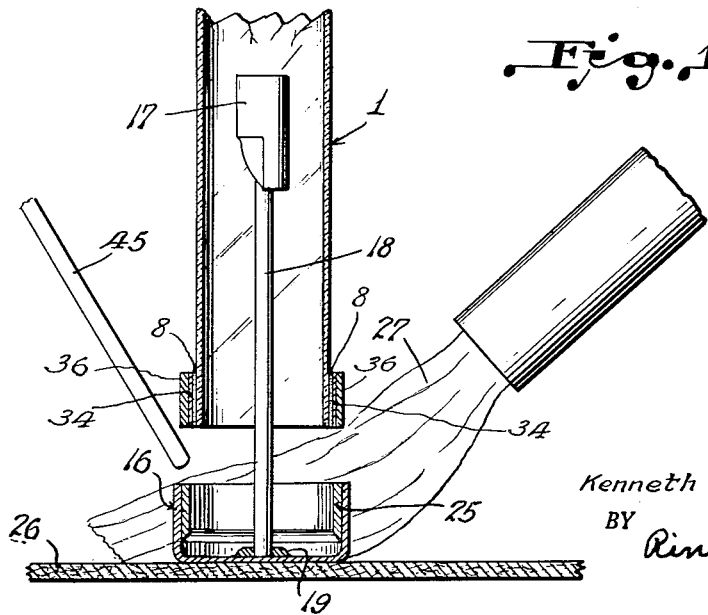

July 24, 1956  K. J. GERMESHAUSEN  2,756,361
GASEOUS-DISCHARGE DEVICE AND METHOD OF MAKING THE SAME
Filed July 6, 1951  5 Sheets-Sheet 4
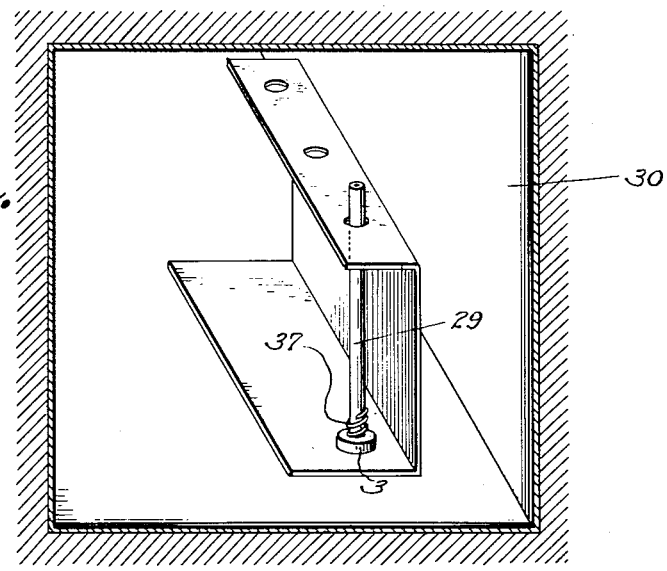
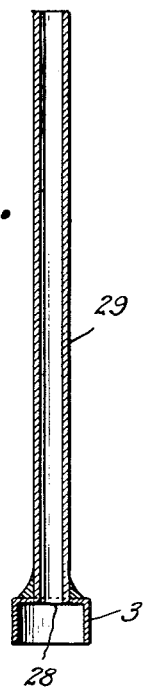
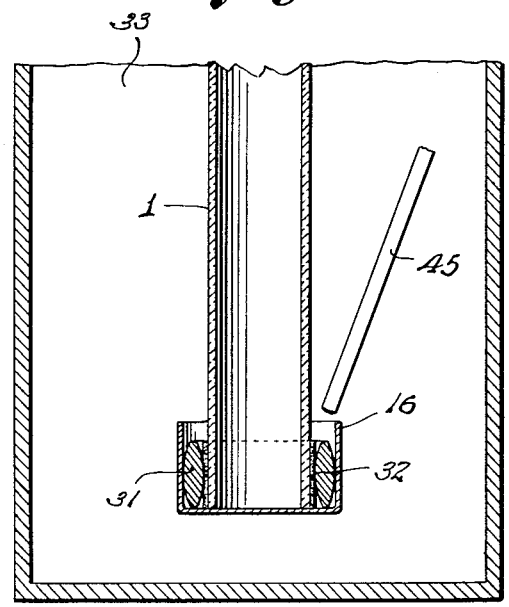
INVENTOR.
Kenneth J. Germeshausen
BY
Rines and Rines
ATTORNEYS.

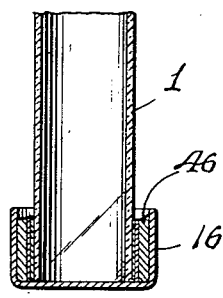
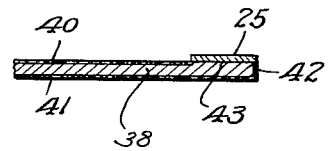
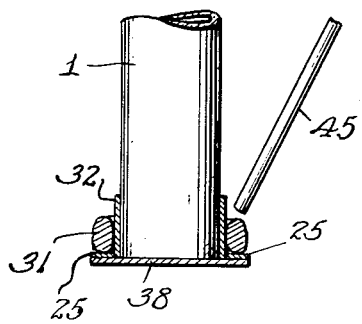
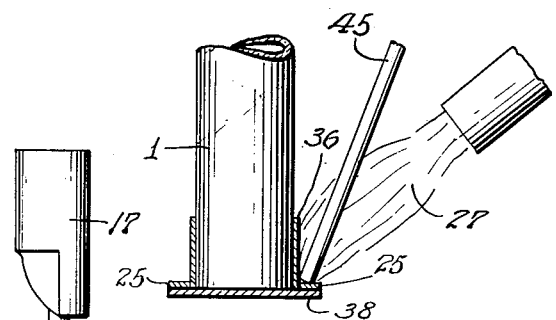
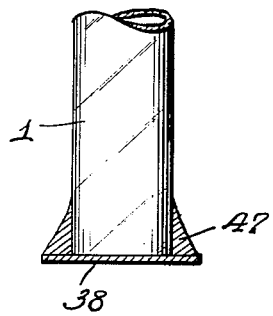
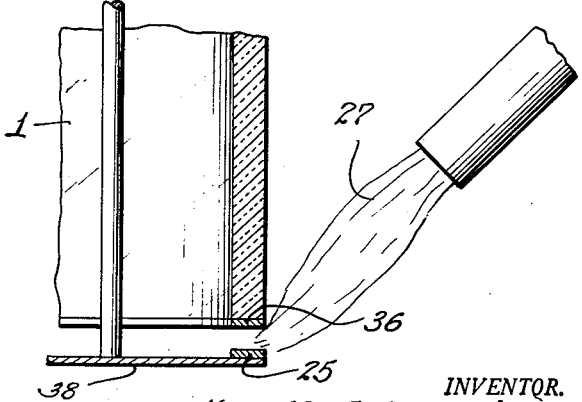

United States Patent Office 2,756,361
Patented July 24, 1956

2,756,361

GASEOUS-DISCHARGE DEVICE AND METHOD OF MAKING THE SAME

Kenneth J. Germeshausen, Newton Center, Mass.

Application July 6, 1951, Serial No. 235,480

15 Claims. (Cl. 313—184)

The present invention relates to gaseous-discharge devices and to methods of making the same. More particularly, the invention relates to gaseous-discharge lamps, commonly known as flashtubes, through the gaseous medium of which flash condensers are electrically discharged for such purposes as to produce a single flash or a repetition of flashes of light in flash photography and stroboscopic work. The envelopes of such flashtubes are usually constituted of some transparent vitreous materials, such as glass or quartz.

The electric discharge of the flash condenser through a flashtube of the above-described character produces a surge of current energy of high-peak value and short duration. In some flashtubes, such as are described, for example, in Letters Patent 2,185,189, 2,201,166 and 2,201,167, issued on January 2, and May 21, 1940, the cathode of the flashtube remains relatively cold, notwithstanding the formation of a cathode spot.

The flashtube operates most efficiently when the energy per flash is very large compared to the size of the flashtube. When this energy, however, exceeds a definite value, the inner surface of the envelope of the flashtube becomes violently overheated locally by contact with the flash-producing arc. In flashtubes the envelopes of which are constituted of glass, this overheating may result in melting the inner surface of the envelope. Subsequent cooling then introduces a maze of cracks, known as "crazing," on the inner surface of the glass envelope.

Though this difficulty may be overcome by using flashtubes the envelopes of which are constituted of quartz, the use of quartz is attended by disadvantages. In the first place, quartz tubing is considerably more expensive than glass. Secondly, quartz offers difficulties of manufacture not encountered in the glass-tube industry. Thirdly, furthermore, owing to the different coefficients of expansion of metal and quartz, it is difficult to provide a good seal between the quartz and the metal wires or other parts that extend through the quartz to the electrodes in the interior of the flashtube envelope. This is a difficulty that has heretofore been overcome only by the employment of bulky and expensive graded seals.

An object of the present invention is to provide a new and improved gaseous-discharge device of the above-described character provided with a vitreous envelope. Specifically, this may be constituted of quartz, but, within certain features of the invention, it may be constituted also of glass and other suitable materials, as well.

A further object of the invention is to provide a new and improved method of making gaseous-discharge devices of the above-described character.

Other and further objects will be explained hereinafter and will be more particularly pointed out in the appended claims.

With the above ends in view, the invention may preferably be embodied in a gaseous-discharge device, such as a flashtube, the ends of the envelope of which, preferably constituted of some vitreous material, such as quartz, or even glass, are sealed by means of soldered metal parts, such as caps or disks. The cathode and the anode electrodes of the tube are carried by the respective metal caps or disks. In practice, one of the metal caps or disks is preferably provided integrally with a metal-tube extension. The air of the gaseous-discharge device may be exhausted and some other gas, such as argon, xenon and the like, may be introduced through the metal-tube extension prior to the completion of the manufacture of the tube, after which the metal-tube extension may be sealed.

According to one method of manufacturing the flashtube or other gaseous-discharge device of the present invention, each end of an open-ended vitreous tube is painted with a coating or layer of a suitable colloidal suspension of a mixture of some suitable metal. This painting may be effected either along the side walls or at the extreme ends of the vitreous tube. In the case of quartz, the colloidally suspended metal may be silver. It is desirable that the colloidal solution contain also a powdered vitreous material. The painted end of the tube is then heated to bake the painted coating or layer thereto, after which the metal cap or disk is soldered to the baked metal layer. It is preferred to plate the silver with a metal, such as nickel, which is not soluble in the solder. This prevents the soldering operation from dissolving the metal layer that has become previously bonded. The nickel or other metal may be replaced by some equivalent, as hereinafter described.

Figure 5:
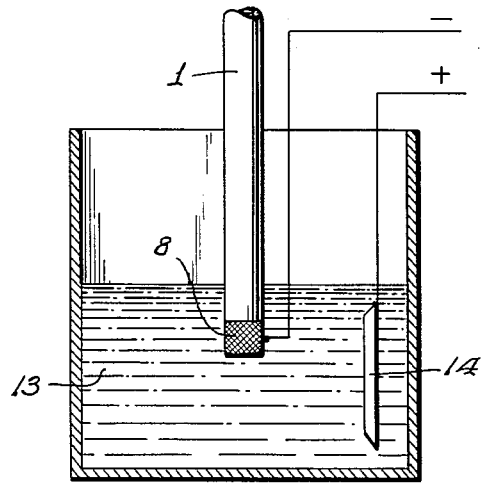
Figure 6:
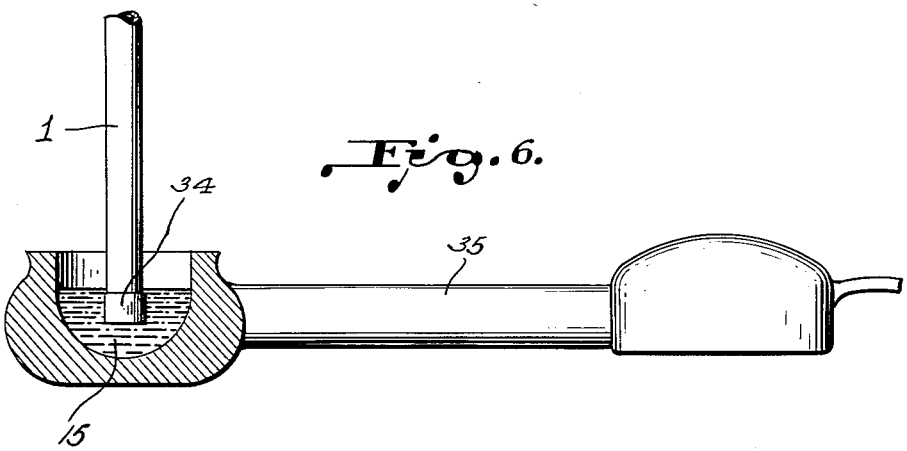
Figure 7:
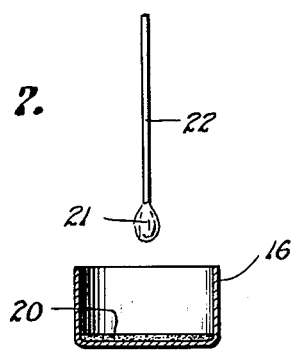

The invention will now be more fully explained in connection with the accompanying drawings, in which Fig. 1 is an elevation of a flashtube constructed according to a preferred embodiment of the present invention; Fig. 2 is a diagrammatic view illustrating an open-ended vitreous tube supported horizontally for rotation by a motor about its axis during the painting, with a brush, of a coating or layer of a desired colloidal solution, near an end thereof; Fig. 3 is a similar diagrammatic view illustrating a later step in the method of manufacture, involving a preliminary heating of the painted coating; Fig. 4 is a similar diagrammatic view illustrating a further heating step; Fig. 5 is a similar diagrammatic view illustrating a subsequent electroplating step; Fig. 6 is a similar diagrammatic view showing the electroplated-metal coating or layer inserted in melted solder; Fig. 7 and 8 are similar diagrammatic views illustrating the preparation of a metal cap that is later to be soldered to the painted end of the said vitreous tube; Fig. 9 is a similar diagrammatic view illustrating the step of applying melted solder to the prepared cap; Fig. 10 is a similar diagrammatic view illustrating the attaching of an electrode to the metal cap; Fig. 11 is a similar diagrammatic view illustrating the heating of solder that has previously been applied to both the vitreous tube and the cap, prior to their assembly; Fig. 12 is a similar diagrammatic view illustrating the step of joining a metal-tube extension to one of the metal caps; Fig. 13 is a longitudinal section of the metal-tube extension after its assembly with the said one metal cap; Fig. 14 is a longitudinal section illustrating a modified method of manufacture; Fig. 15 is a fragmentary longitudinal section of the completed device; Fig. 16 is a similar section illustrating a further modified method of manufacture; Fig. 17 is a similar section illustrating the device manufactured by the method illustrated in Fig. 16; Fig. 18 is a fragmentary section of a metal disk treated for assembly with a suitably prepared vitreous tube; and Figs. 19 and 20 are fragmentary sections illustrating two methods of manufacture employing the metal disk illustrated in Fig. 18.

A gaseous-discharge flashtube embodying the present invention is illustrated as comprising a transparent tube 1, which may be constituted of some vitreous material, such as glass or quartz. The tube 1 is illustrated as straight, but it may be coiled into the form of a helix or spiral, and it may also have other shapes. Its inner diameter is not much greater than the cross-dimension of the hereinafter described electrodes 17 and 18 and it must be at least equal to and usually less than the separation between the electrodes, as later discussed, in order that the inner walls of the completed tube are in close enough proximity to the electrodes to be subjected to the before-described contact with the actual momentary arc-discharge between the electrodes. Whatever the shape of the tube 1, its ends are sealed with the aid of metal caps 2 and 3 or metal disks 38. The metal cap 3 is shown provided with a metal-tube extension 4, sealed at 5. If a metal disk 38 is employed instead of the cap 3, it will be similarly provided with the sealed metal-tube extension 4.

According to one embodiment of the invention, as illustrated in Fig. 2, the gaseous-discharge device may be manufactured by first positioning the tube 1, which is at this time open-ended, horizontally along the axis of a slowly rotating motor 6. During such rotation, a portion of the side wall of the tube 1, near either end thereof, is maintained in contact with a brush 7 that has been dipped into a colloidal suspension of a suitable metal. A layer or coating 8 of the colloidal suspension is thus applied to the said side wall of the tube 1, by the brush 7. In some cases, as will hereinafter appear, the extreme end wall 39 of the tube 1 may be so provided with the layer or coating 8 of the colloidal suspension. In the case of quartz tubing, a metal suspended in the colloidal solution may be silver. Other metals, such as platinum, may also be employed. So-called "liquid silver" colloidal suspensions contain also other ingredients in an organic medium, such as lavender oil. It is desirable also that the colloidal suspension shall contain some powdered vitreous material, such as glass. Prior to the coating step, the tube 1 should preferably be thoroughly cleaned and roughened, as with the aid of emery cloth.

The coating or layer 8 is allowed to dry, after which the end of the tube 1 upon which the coating 8 has been painted may be inserted in an open-ended tube 9 that is shown supported on a bracket 10. The tube 9 is then heated in any desired manner, as by means of the flame 12 of a Bunsen burner 11. During this heating, the painted end of the tube 1 is maintained in the air that enters the tube 9 through the open ends thereof. This enables burning away of the organic constituents of the coating or layer 8 of the colloidal suspension. After a sufficient period of this heating, the tube 1 may be removed from the tube 9, and its painted end is then heated to redness by inserting it directly in the flame 12 of the Bunsen burner 11, as shown in Fig. 4. This two-step method of baking the coating or layer 8 is preferable to applying the maximum amount of heat to the coating or layer 8 directly in only a single step. An electric furnace may be employed instead, if desired.

The steps thus far described have served to bond the coating or layer 8 of silver or other metal integrally to the tube 1 in the form of a mirror-like film. The powdered glass or other vitreous material contained in the colloidal suspension serves to aid in this bonding action.

The end of the tube 1 that has had this metallized coating or layer 8 bonded thereto is next inserted in an electroplating bath 13. In this bath, it serves as a cathode, the anode being shown at 14. The electroplating process will result in covering the bonded metal coating or layer 8 with a coating or layer 34 of metal, such, for example, as nickel or copper.

As illustrated by Fig. 6, the said end of the tube 1 is now inserted in solder 15, maintained liquid in a suitable soldering implement 35. The solder may, for example, be constituted of 60% tin and 40% lead. A layer 36 of solder becomes thus deposited upon the layer 34 of plated metal.

A cap 16 or a disk 38, constituted of a suitable metal, such as iron, copper or brass, is next prepared. The cap 16 may be of diameter such that the tube 1 shall fit therein, or slightly larger. The disk 38 may be of the same diameter as the diameter of the tube 1, as shown in Fig. 20, or slightly larger, as illustrated in Figs. 16, 17 and 19. If the tube 1 is constituted of quartz, the metal of the cap 16 or the disk 38 may be constituted of Invar, which has approximately the same coefficient of expansion as that of quartz. If the cap 16 or the disk 38 should be constituted of a metal the coefficient of expansion of which is substantially different from that of the tube 1, there would be a slight tendency for the tube 1 to break at the point where it projects beyond the cap 16 or where it is joined to the disk 38. The softness of the solder, however, allows the use of metal caps 16 and metal disks 38 having coefficients of expansion differing widely from that of the quartz or glass.

In the case of the cap 16, a layer of colloidal graphite 20 is then applied to the inside surface of its bottom wall. This may be effected by merely letting fall thereon a drop 21 of colloidal graphite suspended in alcohol. The drop 21 is illustrated in Fig. 7 as falling from a wire 22. A similar layer 23 of graphite is applied also to the entire outside surfaces of the bottom and side walls of the cap 16, as by means of a brush 39, illustrated by Fig. 8. In the case of the disk 38, graphite layers 40, 41 and 42 may similarly be applied throughout its upper and lower surfaces, as illustrated in Fig. 18, and throughout its end surface, except along a peripheral ring 43 on its upper surface.

The cap 16 is then inserted, in inverted form, into melted solder 24, as shown in Fig. 9. This results, as illustrated in Fig. 10, in the deposit of a layer 25 of solder upon the inside surfaces of the side walls of the cap 16. A layer 25 of solder may similarly be applied to the peripheral ring 43 of the metal disk 38. If this ring is of the same width as the thickness of the glass tube 1, this may be less than 1/32 of an inch. The graphite layers 20 and 23 or 40, 41 and 42 prevent the solder from sticking to those portions of the cap 16 or the disk 38, respectively, where its presence is not desired. The graphite layers 20 and 23 or 40, 41 and 42 are now removed from the cap 16 or the metal disk 38, leaving the solder layer 25 hardened in place.

An electrode 17, such as an anode or a cathode, of cross-dimension not much smaller than that of the envelope 1 is carried by a nickel, iron or other suitable wire 18. The electrode 17 is next secured centrally to the inside surface of the bottom wall of the cap 16, as shown at 19, Fig. 10, or to the said upper surface of the disk 38, as illustrated in Fig. 20. A suitable method of securing the wire 18 to the cap 16, or the disk 38 is by spot welding.

Referring to Fig. 11, the cap 16, with the electrode 17 carried thereby, is next positioned so that the outside surface of its bottom wall rests on an asbestos table 26. The tube 1, prepared as above described, is next positioned thereover, with the said prepared end thereof just above the cap 16 on the table 26, as is also shown in Fig. 11. The solder layer 25 on the cap 16 and the solder layer 36 on the tube 1 are then heated, as by means of a flame 27, and the tube 1 is then pushed downward into the cap 16. The solder layer 36 on the outside surface of the tube 1 will thereupon fuse to the solder layer 25 on the inside surface of the cap 16, which will result in sealing the cap 16 to the said end of the tube 1. If the tube 1 does not fit tightly in the cap 16, solder from a solder stick 45 may be melted into the space between them during this operation. In finished form, this cap 16 is represented in Fig. 1 at 2. Upon an enlarged scale, it is represented in Fig. 15, with the fused solder 46 interposed between the glass tube 1 and the metal cap 16.

A similar procedure will be employed to seal the metal cap 3 to the other end of the tube 1. The cap 3 differs from the cap 2, however, in that its bottom wall is provided with a centrally disposed opening 28, Fig. 13, along which a metal-tube extension 29 is secured. A metal disk 38 may similarly be provided with the centrally disposed opening 28, if it is employed instead of the cap 3. The preferred method of securing the metal-tube extension 29 to the cap 3 or this disk 38 is illustrated in Fig. 12. The cap 3 is shown in Fig. 12 supported in a furnace 30 that is filled with hydrogen, and the metal-tube extension 29 is shown supported thereover, with its lower end covering the opening 28. A helix 37 of a suitable solder wire, such as silver, is wound around the metal-tube extension 29, and is allowed to rest, by gravity, in contact with the exterior surface of the bottom wall of the cap 3 or the exterior surface of the disk 38 that is provided with the opening 28. If the metal-tube extension 29 is constituted of copper, the solder helix 37 may be of silver. The heat provided by the furnace will melt the solder helix 37, with the result that the metal-tube extension 29 will become integrally joined to the cap 3 or this disk 38 at the opening 28. The hydrogen furnace 30 will maintain the parts bright, so as to permit firing to the melting point of the silver-helix solder 37, and to provide for integral joining together of the parts.

The cap 3 is then treated in the same way as described above in connection with the cap 16, as illustrated by Fig. 11. After it has been soldered to the other end of the tube 1, the metal-tube extension 29 is connected to a suitable air pump, not shown, in order to pump out the air in the tube 1, and to introduce any desired gas, such as argon or xenon, into the tube 1. The free end of the metal-tube extension 29 is then closed, as shown at 5, completing the manufacture of the discharge device.

A suitable solder may be constituted of lead containing 5% of silver or indium. As illustrated in Fig. 14, a solder ring 31 of such material may be positioned between the glass or quartz tube and the walls of the cap 16, with only a layer 32 of powdered titanium hydride, in a suspension of an organic solvent, painted on the quartz tube with a brush. In this case, it is not necessary to plate the tube 1, as illustrated in Fig. 5, prior to the soldering operation. The titanium hydride will enable the solder to bond the metal to the glass or quartz without the aid of such plating. An additional solder stick 45 may be employed. The parts may become joined together in a furnace 33 in an inert atmosphere of helium, argon or other suitable gas. The result is again illustrated, upon an exaggerated scale, in Fig. 15. A satisfactory indium-tin solder that will wet glass and quartz directly is marketed by the Cerro de Pasco Company.

If the disk 38 is employed, the same result may be attained as by the method illustrated in Fig. 14 by positioning the solder ring 31 upon the solder ring 25 upon a peripheral portion of the disk 38 that projects slightly beyond the tube 1, as illustrated in Fig. 16. An additional solder stick 45 may again be employed, if desired. The resulting structure involves a solder deposit 47 between the glass or quartz tube 1 and the disk 38, as shown in Fig. 17. The same result may be brought about without the aid of the solder ring 31, as illustrated in Fig. 19. In that event, however, the tube 1 is first provided with the painted layer 8, the plated silver layer 34 and the solder layer 36, as described above. If the extreme end of the tube 1 is so provided with the solder layer 36, it may be joined directly to the peripheral solder layer 25 of the ring 28, as shown in Fig. 20. In that event, the disk 38 may be of the same diameter as that of the tube 1.

Normally, soft-solder joints would not be considered for quartz tubes, because of the low melting point of the solder. The purpose in using quartz is generally to obtain high average operating temperatures, as, for example, in high-pressure mercury lamps. The flashtube problem however is unique in that, while the average temperature of the tube may be quite low, the instantaneous surface temperature of the tube, in the region of the discharge, may be very high, requiring the use of a very refractory material, such as quartz. The methods of manufacture above-described are particularly adapted for the manufacture of such flashtubes the average operating temperature of which is low, notwithstanding that the instantaneous temperature is very high.

Though materials such as Invar have a coefficient of expansion appproximately matching that of quartz, this is true over only a limited temperature range, up to about 350° F. Such materials can not, therefore, be used for seals in tubes operating at high temperatures, or for making seals which must be made at high temperatures. It is believed that the present invention provides for the first time, therefore, a quartz gaseous-discharge flash tube that is sealed at its ends by metal caps.

A flashtube manufactured in accordancce with the present invention, with the anode and cathode electrodes thereof spaced six inches, of 6-millimeters' external diameter, 4-millimeters' internal diameter, filled with xenon at a pressure of 30 centimeters, will start at approximately 3,000 volts. The flashtube may be designed, however, of other dimensions, to start at other voltages, such as several thousand volts, between the cathode and the anode. If provided with an external electrode, such as a wire, not shown, coiled around the envelope of the flashtube 1, the value of the voltage required to produce breakdown between the anode and the cathode may be reduced. The voltage may be applied by means of a discharge condenser, not shown, between the anode and the cathode.

Modifications will occur to persons skilled in the art, and all such are considered to fall within the spirit and scope of the present invention, as defined in the appended claims:

What is claimed is:

1. A gaseous-discharge flashtube having an open-ended tubular quartz envelope to the open ends of which are soldered metal elements that are interiorly provided integrally with an anode and a cathode, respectively, the inner surface of the envelope in the region of the anode and cathode being in close proximity to the anode and cathode and the envelope containing a gas through which a flash condenser is adapted to discharge between the anode and the cathode in the form of a surge of current of high-peak energy and short duration in order to produce a flashing arc that contacts instantaneously with the said proximate inner surface of the envelope, thereby violently overheating the contacted region of the said inner surface locally, though the average temperature of the envelope is maintained relatively low.

2. A gaseous-discharge flashtube having an open-ended tubular quartz envelope to the open ends of which are soldered metal elements that are interiorly provided integrally with an anode and a cathode, respectively, the inner surface of the envelope in the region of the anode and cathode being in close proximity to the anode and cathode and the envelope containing a gas through which a flash condenser is adapted to discharge between the anode and the cathode in the form of a surge of current of high-peak energy and short duration in order to produce a flashing arc that contacts instantaneously with the said proximate inner surface of the envelope, thereby violently overheating the contacted region of the said inner surface locally, though the average temperature of the envelope is maintained relatively low, one of the metal elements being exteriorly provided integrally with a sealed metal-tube extension through which the gas was introduced into the envelope prior to the sealing thereof.

3. A gaseous-discharge flashtube having an open-ended tubular vitreous envelope to the open ends of which are soldered metal elements that are interiorly provided integrally with an anode and a cathode, respectively, the inner surface of the envelope in the region of the anode and cathode being in close proximity to the anode and cathode on the envelope containing a gas through which a flash condenser is adapted to discharge between the anode and the cathode in the form of a surge of current of high-peak energy and short duration in order to produce a flashing arc that contacts instantaneously with the said proximate inner surface of the envelope, thereby violently overheating the contacted region of the said inner surface locally, though the average temperature of the envelope is maintained relatively low.

4. A gaseous-discharge flashtube having an open-ended tubular vitreous envelope to the open ends of which are soldered metal elements that are interiorly provided integrally with an anode and a cathode, respectively, the inner surface of the envelope in the region of the anode and cathode being in close proximity to the anode and cathode and the envelope containing a gas through which a flash condenser is adapted to discharge between the anode and the cathode in the form of a surge of current of high-peak energy and short duration in order to produce a flashing arc that contacts instantaneously with the said proximate inner surface of the envelope, thereby producing a relatively high instantaneous surface temperature at the region of the discharge, though the body of the tube and, therefore, the junctures between the vitreous envelope and the metal elements also, are subjected to a relatively low average temperature, permitting the attachment of the metal elements to the vitreous envelope with the aid of soft solder.

5. A gaseous-discharge flashtube providing a source of instantaneous momentary light having an open-ended tubular transparent quartz envelope to the open ends of which are soldered metal elements that are interiorly provided integrally with an anode and a cathode, respectively, the inner surface of the envelope in the region of the anode and cathode being in close proximity to the anode and cathode and the envelope containing a gas through which a high-voltage flash condenser is adapted to discharge between the anode and the cathode in the form of a surge of current of high peak energy and short duration in order to produce a corresponding flashing arc of short duration that contacts instantaneously with the said proximate inner surface of the envelope, thereby violently overheating the contacted region of the said inner surface locally at a temperature in excess of the melting point of the solder, the average temperature of the envelope being maintained relatively low below the said melting point.

6. A gaseous-discharge flashtube having an open-ended tubular vitreous envelope to the open ends of which are soldered metal cover elements that are interiorly provided integrally with an anode and a cathode, respectively, the inner-surface cross-dimension of the envelope in the region of and in the space between the anode and cathode being at least equal to or less than the spacing between the anode and cathode and the envelope containing a gas through which a flash condenser is adapted to discharge between the anode and the cathode in the form of a surge of current of high-peak energy and short duration in order to produce a flashing arc that contacts instantaneously with the inner surface of the envelope, thereby violently overheating the contacted region of the said inner surface locally, though the average temperature of the envelope is relatively low.

7. A gaseous-discharge flashtube having an open-ended tubular vitreous envelope to the open ends of which are soldered metal cover elements that are interiorly provided integrally with an anode and a cathode, respectively, the inner-surface cross-dimension of the envelope in the region of and in the space between the anode and cathode being less than the spacing between the anode and cathode and the envelope containing a gas through which a flash condenser is adapted to discharge between the anode and the cathode in the form of a surge of current of high-peak energy and short duration in order to produce a flashing arc that contacts instantaneously with the inner surface of the envelope, thereby violently overheating the contacted region of the said inner surface locally, through the average temperature of the envelope is relatively low.

8. A gaseous-discharge flashtube having an open-ended tubular vitreous envelope to the open ends of which are soldered metal cover elements that are interiorly provided integrally with an anode and a cathode, respectively, the inner-surface cross-dimension of the envelope in the region of and in the space between the anode and cathode being less than the spacing between the anode and cathode and the envelope containing a gas through which a flash condenser is adapted to discharge between the anode and the cathode in the form of a surge of current of high-peak energy and short duration in order to produce a flashing arc that contacts instantaneously with the inner surface of the envelope, thereby violently overheating the contacted region of the said inner surface locally, through the average temperature of the envelope is relatively low, one of the metal elements being exteriorly provided integrally with a sealed metal-tube extension through which the gas was introduced into the envelope prior to the sealing thereof.

9. For use in an electric high-voltage flash-producing circuit having a high-voltage flash condenser, a gaseous-discharge flashtube providing a source of instantaneous momentary light having an open-ended tubular transparent vitreous envelope to the open ends of which are soldered metal cover elements that are adapted for connection to the said high-voltage flash condenser and are interiorly provided integrally with an anode and a cathode, respectively, the inner surface of the envelope in the region of the anode and cathode being in close proximity to the same, the envelope containing a gas through which the said high-voltage flash condenser is adapted to discharge between the anode and the cathode in the form of a surge of current of high-peak energy and short duration in order to produce a flashing arc that contacts instantaneously with the said proximate inner surface of the envelope, thereby violently overheating the arc-contacted region of the said inner surface locally at a high instantaneous surface temperature in excess of the melting point of the solder, through the body of the envelope and, therefore, the junctures between the vitreous envelope and the metal elements also, are subjected to a relatively low average temperature below the said melting point.

10. For use in an electric high-voltage flash-producing circuit having a high-voltage flash condenser, a gaseous-discharge flashtube providing a source of instantaneous momentary light having an open-ended tubular transparent vitreous envelope to the open ends of which are soldered metal cover elements that are adapted for connection to the said high-voltage flash condenser and are interiorly provided integrally with an anode and a cathode, respectively, positioned sufficiently close to the respective metal elements that, were the flashtube operated continuously instead of in momentary discreet flashes, the body of the envelope would assume a temperature in excess of the melting point of the solder, the inner surface of the envelope in the region of the anode and cathode being in close proximity to the same, the envelope containing a gas through which the said high-voltage flash condenser is adapted to discharge between the anode and the cathode in the form of a surge of current of high-peak energy and short duration in order to produce a flashing arc that contacts instantaneously with the said proximate inner surface of the envelope, thereby violently overheating the arc-contacted region of the said inner surface locally at a high instantaneous surface temperature in excess of the melting point of the solder, though the body of the envelope and, therefore, the junctures between the vitreous envelope and the metal elements also, are subjected to a relatively low average temperature below the said melting point.

11. For use in an electric high-voltage flash-producing circuit having a high-voltage flash condenser, a gaseous-discharge flashtube providing a source of instantaneous momentary light having an open-ended tubular transparent vitreous envelope to the open ends of which are soldered metal cover elements that are adapted for connection to the said high-voltage flash condenser and are interiorly provided integrally with an anode and a cathode, respectively, the inner surface of the envelope in the region of the anode and cathode being in close proximity to the same with the inner-surface cross-dimension of the envelope in the said region and in the space between the anode and cathode being at least equal to or less than the spacing between the anode and the cathode, the envelope containing a gas through which the said high-voltage flash condenser is adapted to discharge between the anode and the cathode in the form of a surge of current of a high-peak energy and short duration in order to produce a flashing arc that contacts instantaneously with the said proximate inner surface of the envelope, thereby violently overheating the arc-contacted region of the said inner surface locally at a high instantaneous surface temperature in excess of the melting point of the solder, through the body of the envelope and, therefore, the junctures between the vitreous envelope and the metal elements also, are subjected to a relatively low average temperature below the said melting point.

12. For use in an electric high-voltage flash-producing circuit having a high-voltage flash condenser, a gaseous-discharge flashtube providing a source of instantaneous momentary light having an open-ended tubular transparent vitreous envelope to the open ends of which are soldered metal cover elements that are adapted for connection to the said high-voltage flash condenser and are interiorly provided integrally with an anode and a cathode, respectively, positioned sufficiently close to the respective metal elements that, were the flashtube operated continuously instead of in momentary discreet flashes, the body of the envelope would assume a temperature in excess of the melting point of the solder, the inner surface of envelope in the region of the anode and cathode being in close proximity to the same with the inner-surface cross-dimension of the envelope in the said region and in the space between the anode and cathode being at least equal to or less than the spacing between the anode and the cathode, the envelope containing a gas through which the said high-voltage flash condenser is adapted to discharge between the anode and the cathode in the form of a surge of current of high-peak energy and short duration in order to produce a flashing arc that contacts instantaneously with the said proximate inner surface of the envelope, thereby violently overheating the arc-contacted region of the said inner surface locally at a high instantaneous surface temperature in excess of the melting point of the solder, though the body of the envelope and, therefore, the junctures between the vitreous envelope and the metal elements also, are subjected to a relatively low average temperature below the said melting point.

13. A flashtube as claimed in claim 10 and in which the said envelope is a substantially cylindrical quartz tube.

14. A flashtube as claimed in claim 11 and in which the said envelope is a substantially cylindrical quartz tube.

15. A process of the character described comprising soldering to the open ends of a tubular transparent vitreous envelope metal elements interiorly provided with an anode and a cathode, respectively, and disposing the inner surface of the envelope in the region of the anode and cathode in close proximity to the anode and cathode, the envelope containing a gas through which a high-voltage flash condenser is adapted to discharge between the anode and the cathode in the form of a surge of current of high-peak energy and short duration in order to produce a corresponding flashing arc of short duration that contacts instantaneously with the said proximate inner surface of the envelope, thereby violently overheating the contacted region of the said inner surface locally at a temperature in excess of the melting point of the solder, the average temperature of the envelope being maintained relatively low below the said melting point.

References Cited in the file of this patent

UNITED STATES PATENTS

| Number | Name | Date |
| --- | --- | --- |
| 480,284 | Scharf | Aug. 9, 1892 |
| 1,884,665 | Greiner | Oct. 25, 1932 |
| 2,075,477 | Smith | Mar. 30, 1937 |
| 2,116,384 | Cartun | May 3, 1938 |
| 2,238,277 | Miller | Apr. 15, 1941 |
| 2,327,622 | Craig | Aug. 24, 1943 |
| 2,386,628 | Nazzewski | Oct. 9, 1945 |
| 2,433,218 | Herzog | Dec. 23, 1947 |
| 2,446,270 | Eitel et al. | Aug. 3, 1948 |
| 2,446,271 | Eitel | Aug. 3, 1948 |
| 2,455,846 | West | Oct. 7, 1948 |
| 2,462,020 | Craig | Feb. 15, 1949 |
| 2,534,548 | Fay et al. | Dec. 19, 1950 |

FOREIGN PATENTS

| Number | Country | Date |
| --- | --- | --- |
| 920,517 | France | Jan. 4, 1947 |